United States Patent [19]

Hammer et al.

[11] 4,287,217

[45] Sep. 1, 1981

[54] MULTIPLE-LAYER TUBING

[75] Inventors: Klaus-Dieter Hammer, Mainz; Martin Schröder, Wiesbaden; Horst Pietruck, Schwabenheim; Max Bytzek, Naurod, all of Fed. Rep. of Germany

[73] Assignee: Hoechst Aktiengesellschaft, Frankfurt am Main, Fed. Rep. of Germany

[21] Appl. No.: 931,133

[22] Filed: Aug. 4, 1978

[30] Foreign Application Priority Data

Aug. 5, 1977 [LU] Luxembourg ............................ 77930
May 16, 1978 [LU] Luxembourg ............................ 79665

[51] Int. Cl.³ .................... F16L 11/00; A23L 1/31; B05D 7/22
[52] U.S. Cl. ................................ 426/105; 138/118.1; 426/135; 427/230; 427/284; 427/290; 428/36; 428/219
[58] Field of Search ................ 428/36, 219, 508, 509, 428/510; 426/105, 135; 138/118.1; 427/230, 284, 290

[56] References Cited

U.S. PATENT DOCUMENTS

| 2,901,358 | 8/1959 | Underwood et al. | 138/118.1 |
| 3,108,017 | 10/1963 | Messwarb et al. | 427/230 |
| 3,144,425 | 8/1964 | Koch et al. | 428/518 |
| 3,378,379 | 4/1968 | Shiner et al. | 427/230 |
| 3,451,827 | 6/1969 | Bridgeford | 138/118.1 |
| 3,690,910 | 9/1972 | Mahe et al. | 427/390 R |
| 3,826,676 | 7/1974 | Heling et al. | 138/118.1 |
| 3,886,979 | 6/1975 | Rasmussen | 138/118.1 |
| 4,002,712 | 1/1977 | Hammer et al. | 264/195 |
| 4,233,341 | 11/1980 | Hammer et al. | 138/118.1 |
| 4,248,912 | 2/1981 | Gerisk et al. | 427/230 |

Primary Examiner—William R. Dixon
Attorney, Agent, or Firm—Schwartz, Jeffery, Schwaab, Mack, Blumenthal & Koch

[57] ABSTRACT

Disclosed is a multiple layered film preferably in the form of a tube and being suitable for forming sausage casings, comprising: a central layer of a cellulose hydrate-based material; a first layer on the inside of the central layer, comprising a film of thermoplastic synthetic resinous material and being impermeable to water and water vapor; and a second layer on the outside of the central layer, comprising a synthetic elastic copolymer and being permeable to water and water vapor. Also disclosed is a method for preparing these film products.

43 Claims, 1 Drawing Figure

MULTIPLE-LAYER TUBING

BACKGROUND OF THE INVENTION

The invention relates to multilayer films in the form of tubing, in particular fiber-reinforced films, which are based on cellulose hydrate and have on the inside a film coating which is impermeable to water and water vapor. The inside coating comprises a film of a synthetic thermoplastic polymer, in particular a copolymer. On the outside the tubing has a permeable layer based on a synthetic elastic copolymer. The invention also relates to processes for the manufacture of skins in the form of tubing, according to the invention, as well as to the use of the said films in the form of tubing as a packaging material, in particular for use as an artificial sausage casing.

Large quantities of cellulose hydrate tubing, having on the inside a film coating which is impermeable to water vapor and consists of a synthetic thermoplastic vinylidene chloride copolymer, are used as artificial sausage casings and are suitable for this purpose because, as a result of extensive shrinkage in the course of their intended use as sausage casings, they are able to fit well around the filling material and thus always yield sausages, the skin of which is in tight contact with the filling material and which thus gives the sausages an attractive appearance.

This advantage of the known artificial sausage casings is at the same time accompanied by a serious defect, namely that artificial casings for sausages are prone to damage by tearing and shock.

U.S. Pat. No. 4,002,712 describes tubing based on cellulose hydrate modified by chemical agents, which tubing is suitable for use as an artificial sausage casing and which, even if its content of water-extractable chemical plasticizer is lost, still has the suppleness which a tubing of cellulose hydrate possesses. Moreover, a proposal which does not yet form part of the state of the art (German Patent Application No. P 26 54 427.4) describes tubing which is suitable for use as an artificial sausage casing and which has been partially plasticized by means of so-called permanent chemical plasticizers, so that, even after its content of water-soluble chemical plasticizer has been lost, it has the suppleness of tubing of cellulose hydrate, or possesses an even better suppleness.

A further proposal which does not yet form part of the state of the art describes tubing based on cellulose hydrate, which is suitable for use as artificial sausage casings and which contains chemical compounds having N-methylolcarbamate end groups in a firm chemical bond. This tubing which has been described likewise retains a good suppleness after loss of the extractable secondary chemical plasticizer which, as a result of the manufacturing process of the tubing, is contained in the wall thereof.

The quantitative loss of water-extractable chemical plasticizer during the intended use of the multilayer film material as artificial sausage casings, for example, during the process of boiling the sausages in hot water, initiates a shrinkage of the casings by about 12 to 15%. As a result, a high internal pressure develops in the filling material cavity of the sausage casing, with a simultaneous embrittlement of the cellulose hydrate layer thereof. This layer is separated on the inside of the tubing from the sausage material which contains moisture by the film coating, which is impermeable to water vapor. This has the consequence of an undesirable extensive tearing and tear propagation of the sausage casings when the sausages are cut open, the sausage material being squeezed out of the cutting surface in an undesirable manner. The sensitivity of sausages of this type to shocks in transit is a further disadvantage inherent in the known and described artificial sausage casings which are based on cellulose hydrate and have on their inside a film coating which is impermeable to water vapor.

Admittedly, it is possible to partially avoid these disadvantages by using the tubing described in the aforesaid U.S. patent or tubing according to the descriptions which do not yet form part of the state of the art. However, in order to eliminate these disadvantages altogether, it would be necessary for the said tubing to contain such a large amount of non-extractable chemical plasticizer that, as a result, an undesirable deterioration of the mechanical properties of the tubing would necessarily result.

SUMMARY OF THE INVENTION

It is therefore the object of the invention to provide an improved multiple layer film material.

It is a particular object of the invention to provide an improved packaging material, especially for use as an artificial sausage casing, having the advantageous properties of cellulose hydrate tubing which are desired for this intended use, without having the disadvantages described above.

Another particular object resides in providing a sausage casing which is not sensitive to shock and in which substantially no tearing or tear propagation of the artificial sausage casing takes place when the sausage is cut open.

It is a further object of the invention to provide a manufacturing process for sausage casings in the form of tubing, which have the desired properties.

In accomplishing the foregoing objects, there has been provided in accordance with the present invention a multiple layered film suitable for forming sausage casings, comprising: a central layer of a cellulose hydrate-based material; a first layer on one side of the central layer, this first layer comprising a film of thermoplastic synthetic resinous material and being impermeable to water and water vapor; and a second layer on the other side of the central layer, this second layer comprising a synthetic elastic copolymer and being permeable to water and water vapor. Preferably, the film is in the form of a tube, wherein the first layer is on the inside surface of the tube and the second layer is on the outside surface of the tube.

In one embodiment, the permeable second layer comprises a copolymer comprising a major proportion of an acrylate, preferably butyl acrylate, methacrylate, preferably butyl methacrylate, or a mixture thereof and a minor portion of acrylic acid, methacrylic acid or a mixture thereof.

In accordance with another embodiment, the permeable second layer comprises a copolymer comprising a major proportion of an aliphatic diene, selected from the group of butadiene, isoprene, chloroprene or a mixture thereof, and a minor proportion of acrylate, methacrylate, acrylic acid, methacrylic acid, acrylonitrile, styrene or a mixture thereof.

In accordance with still another embodiment, the permeable second layer comprises a blend of chemically different elastomeric copolymers. In one instance the blend can be of a plurality of chemically different elastic copolymers, with each copolymer comprising a major proportion of an acrylate, methacrylate or a mixture thereof and a minor portion of acrylic acid, methacrylic acid or a mixture thereof. In another instance, the blend can comprise (1) a copolymer comprising a major proportion of an acrylate, methacrylate or a mixture thereof and a minor portion of acrylic acid, methacrylic acid or a mixture thereof and (2) a copolymer comprising a major proportion of an aliphatic diene, selected from the group of butadiene, isoprene, chloroprene or a mixture thereof.

In accordance with another aspect of the present invention, the permeable layer on the outside of the tubing comprises an elastic copolymer which, completely or to the extent of the quantitatively predominant part, relative to the total weight of the copolymer, is made up of polyurethane structural units and which, to the extent of the quantitatively smaller part, if appropriate, is derived from copolymerized monomers from a group comprising acrylates, methacrylates, acrylic acid, methacrylic acid, styrene as well as acrylonitrile.

In accordance with another aspect of the present invention, there has been provided a process for producing a multiple layered film in the shape of a tube as defined above, comprising the steps of: coating a carrier tube of a cellulose hydrate-based material on its inside surface with a first layer of a synthetic thermoplastic polymer, this first layer being impermeable to water and water vapor; applying to the outside surface of the carrier tube an aqueous dispersion of a synthetic elastic copolymer, wherein the major proportion of the copolymer comprises particles having a size not larger than about 0.08 μm, to produce on the outside surface of the carrier tube a layer of copolymer having a thickness corresponding to a weight per unit area of from about 0.5 to 8 gram of copolymer per m² of carrier tube surface; drying the tube to remove the water from the dispersion; and preferably moistening the dried tube to a predetermined water content.

Other objects, features and advantages of the present invention will become apparent from the detailed description of preferred embodiments which follows, when considered in light of the attached FIGURE of drawing.

BRIEF SUMMARY OF THE DRAWING

The FIGURE of drawing is a cross-sectional view of a sausage casing according to the invention.

DETAILED DESCRIPTION OF PREFERRED EMBODIMENTS

Multiple layer films in the form of tubing, most preferably fiber-reinforced films, which are designed according to the invention, are also simply referred to as "tubing" in the following text.

The preferably fiber-reinforced substrate based on cellulose hydrate, on which the films according to the invention in the form of tubing are based, is called "carrier tubing".

The synthetic thermoplastic polymers, most preferably copolymers, which form the film coating impermeable to water and water vapor and which are based on vinylidene chloride, as well as the elastic copolymers building up the permeable layer are comprised of macromolecular chains of regularly or irregularly recurring chemical units of molecular structure, which units are derived from polymerized or copolymerized monomers of corresponding structure. That is to say, they are formed by polymerization or copolymerization of a mixture of copolymerizable monomers. The qualitative chemical characterization of a copolymer by the statement that it is derived from defined and stated monomers is tantamount to the formulation that the copolymer can be produced by copolymerization of a qualitatively defined and stated monomer mixture.

The above explanation applies not only to the polymers or copolymers which form the film coating or the permeable layer of the tubing, but also to the qualitative and quantitative concrete definition of the chemical structure of the copolymers dispersed in the aqueous dispersions which are used according to the process.

As a result of its manufacture and in a manner which is in itself known, the carrier tubing based on cellulose hydrate preferably contains water and additionally a secondary chemical plasticizer, for example, in the form of glycerol or triglycol, or a secondary chemical plasticizer based on polyglycol having a molecular weight in the range of from about 600 to 5,000, preferably from about 1,000 to 4,000, by itself or as a mixture with glycerol and/or triglycol. When tubing is used which contains a low-molecular weight secondary chemical plasticizer, such as, for example, glycerol or triglycol, the plasticizer fraction is substantially quantitatively dissolved out of the tubing skin during the preparation of sausages. Since the said low-molecular weight secondary chemical plasticizers are less readily or less rapidly dissolved out of the skin during the preparation of sausages, the shrinkage behavior of the tubing, when it is used as an artificial sausage casing in the preparation of sausages, can be varied within certain limits by a corresponding combination of the said secondary chemical plasticizers and can be adapted to the pressure in the interior of the sausage. The range of variation can be further extended if the tubing which is used as the starting material and is based on chemically modified cellulose hydrate, contains a predetermined amount of a chemical plasticizer which is not extractable by water (that is to say which is permanent).

The expression "carrier tubing based on cellulose hydrate", as used within the scope of the description of the invention, is intended to comprise, according to the definition, tubing or carrier tubing which in its chemical composition has a structure corresponding to the following possibilities (a) to (i) and accordingly comprises in each case:

(a) cellulose hydrate or
(b) cellulose hydrate and water or
(c) cellulose hydrate and secondary chemical plasticizer, such as, for example, glycerol, or
(d) cellulose hydrate, water and secondary chemical plasticizer or
(e) chemically modified cellulose hydrate with a chemical plasticizer, which is not extractable from the cellulose hydrate by water, or
(f) a mixture of cellulose hydrate and chemically modified cellulose hydrate according to (e) or
(g) a chemically modified cellulose hydrate according to
(e) and water or
(h) a chemically modified cellulose hydrate according to
(e), water and a secondary chemical plasticizer or (i) mixtures of cellulose hydrate, chemically modified cellulose hydrate according to (e) and water as well as, if desired, a secondary chemical plasticizer.

In addition to chemically modified cellulose hydrate, tubing according to (e) contains an amount, which is not essential for its properties, of cellulose hydrate without chemical modification.

Carrier tubing of the chemical structure according to (a) to (i) having a fiber reinforcement is preferred here, that is to say, that which has in its wall a fiber matrix, preferably a matrix based on fibrillate paper.

The film coating which is formed without interruptions and which is impermeable to water and water vapor on the inside of the skin in the form of tubing comprises synthetic thermoplastic polymer, in particular a copolymer, based on vinylidene chloride with a quantitatively predominant fraction of vinylidene chloride, relative to the total weight of the copolymer. Film coatings of this type, which are impermeable to water and water vapor, and which are coated on the surface of tubing of cellulose hydrate are described in the literature, e.g., U.S. Pat. Nos. 3,108,017; 2,961,323; 2,748,027 and 2,570,478; British Patent Specification No. 1,201,830. The disclosures of these are hereby incorporated by reference.

For forming the film coatings on the inside of the tubing, particularly preferred vinylidene chloride copolymers which are impermeable to water vapor and water are here those which are known and which are derived from copolymerized vinylidene chloride, copolymerized acrylate or methacrylate, copolymerized acrylic acid or methacrylic acid and copolymerized acrylonitrile. Particularly preferred is a copolymer comprised of copolymerized vinylidene chloride to the extent of about 88% by weight, copolymerized methyl acrylate to the extent of about 1.5% by weight, copolymerized acrylic acid to the extent of about 3% by weight and acrylonitrile to the exxtent of about 7.5% by weight. The percent by weight data here each refer to the total weight of the copolymer.

The coating which is impermeable to water vapor and water and comprises a synthetic thermoplastic polymer, in particular a copolymer, is formed so that it is closed and fre from perforations, and it prevents the passage of water not only because of its chemical structure but also because it has no perforations.

If desired, an adhesion-promoting chemical material may be provided between the inside of the carrier tubing based on cellulose hydrate and the film coating of a thermoplastic synthetic copolymer. Adhesion layers of this type between film coatings of the said chemical structure and the surface of the carrier tubing based on cellulose hydrate are described in the literature and comprise, for example, urea/formaldehyde pre-condensate, melamine/formaldehyde pre-condensate or epichlorohydrin/polyamide/polyamine pre-condensate or guanidine ureate.

If desired, an adhesion-promoting chemical agent, for example, a urea/formaldehyde pre-condensate, melamine/formaldehyde pre-condensate or an epichlorohydrin/polyamide/polyamine pre-condensate or guanidine ureate, is also provided between the surface of the carrier tubing and the permeable layer of elastic polymer on the outside of the tubing.

The permeable layer located on the outside of the tubing is comprised of elastic copolymers or comprises a blend of copolymers. Within the scope of the description of the invention, elastic copolymers are to be understood as those for which the name "elastomers" is customary. For a definition of the term "elastomers" see Bildmeyer, "Textbook of Polymer Chemistry", New York, 1957, page 154; Houwink, "Elastomers and Plastomers", New York-Amsterdam, Elsevier; Römpp, "Chemie-Lexikon [Dictionary of Chemistry]". These definitions are hereby incorporated by reference.

Elastic copolymers which are suitable according to the invention, in addition to other physical characteristics or properties, are characterized by a rubber-like tension/elongation behavior (tension/elongation characteristics) of shaped structures, for example self-supporting films, which can be produced as test specimens from these copolymers; these properties are particularly essential to the invention.

The layer on the outside of the tubing skin is regarded as permeable if it does not impede the passage of water or aqueous solutions.

The properties desired according to the invention for the tubing depend in particular on the properties of the layer on its outside, which properties result from the chemical/material structure thereof and from its three-dimensional structure shape. It is essential for the three-dimensional structural shape of the layer on the outside of the tubing that the aqueous copolymer dispersion which is used in the manufacture of the tubing, according to the invention, comprises a quantitatively predominant part of dispersed copolymer particles having a particle size of not more than about 0.08 $\mu$m, preferably a particle size of about 0.05 $\mu$m and smaller. To form permeable layers which are suitable according to the invention, the copolymer dispersions contain copolymer particles of a particle size greater than about 0.08 $\mu$m only in such an amount—if any—that the formation of permeable layers according to the definition is not prevented thereby.

The total inventive concept comprises the following embodiments or variants of the invention, which differ from one another in the chemical/material structure of their particular permeable layers on the outside, as indicated below.

First embodiment of the invention:

The permeable layer comprises a copolymer of about 91 to 98% by weight of (copolymerized) acrylate or methacrylate, preferably butyl acrylate or butyl methacrylate or mixtures thereof, and of about 9 to 2% by weight of (copolymerized) acrylic acid, methacrylic acid or mixtures thereof. The percent by weight data each refer to the total weight of the copolymer.

A copolymer comprised of about 98% by weight (copolymerized) butyl acrylate and of about 2% by weight (copolymerized) acrylic acid is particularly preferred.

Second embodiment of the invention:

The permeable layer on the outside comprises a copolymer of about 70 to 80% by weight (copolymerized) butyl acrylate, butyl methacrylate or mixtures thereof, of about 29 to 15% by weight (copolymerized) ethyl acrylate, ethyl methacrylate or mixtures thereof, and of about 1 to 5% by weight (copolymerized) acrylic acid, methacrylic acid or mixtures thereof. A copolymer which, within the confines of the quantitative data, comprises (copolymerized) butyl acrylate, (copolymerized) ethyl acrylate and (copolymerized) acrylic acid, is very particularly preferred in this case.

The percent by weight data here each refer to the total weight of the copolymer.

Third embodiment of the invention:

The copolymer which forms the permeable layer differs from that of the first embodiment of the invention in that the molecular chains of the copolymer forming the layer contain molecular structural units, in addition to those mentioned, which are derived from copolymerized acrylonitrile, styrene or mixtures of the two.

Fourth embodiment of the invention:

The permeable layer on the outside of the tubing comprises, according to the fourth variant of the invention, a copolymer which, to the extent of the quantitatively predominant part, relative to the total weight of the copolymer, is derived from (copolymerized) aliphatic dienes, selected from the group comprising butadiene, chloroprene and isoprene, and which, to the extent of the quantitatively smaller part, is made up of (copolymerized) acrylates, in particular butyl acrylate, methacrylates, in particular butyl methacrylate, acrylic acid, methacrylic acid, acrylonitrile, styrene or mixtures thereof.

Fifth embodiment of the invention:

According to this variant of the invention, the permeable layer on the outside of the tubing comprises an elastic copolymer which, completely or to the extent of the quantitatively predominant part, relative to the total weight of the copolymer, is made up of polyurethane structural units and which, to the extent of the quantitatively smaller part, if appropriate, is derived from copolymerized monomers from a group comprising acrylates, methacrylates, acrylic acid, methacrylic acid, styrene as well as acrylonitrile.

According to a sixth embodiment of the invention, the permeable layer on the outside of the tubing comprises a copolymer blend, the first component of which, forming the quantitatively predominant part of the copolymer, relative to its total weight, comprises an elastic copolymer according to the first or the second embodiment of the invention, and the second component of which, representing the quantitatively smaller part of the blend, relative to its total weight, comprises the elastic copolymers according to the fourth embodiment of the invention. Layers are preferred in this case which comprise a copolymer blend of about 80% by weight in total of the first component and of about 20% by weight in total of the second component, each in accordance with the qualitative definition indicated above. The percent by weight data here each refer to the total weight of the copolymer blend.

The layers according to the second embodiment of the invention are distinguished in particular in that they are soft without, however, a tendency to blocking.

The permeable layer on the outside of the tubing has a thickness which corresponds to a weight per unit area in the range of from about 0.5 to 8 g, preferably from about 1 to 5 g, of copolymer or copolymer blend per m$^2$ of substrate surface.

The permeable layer on the outside of the carrier tubing is shaped, with respect to its three-dimensional structure, in such a way that it has a plurality of irregularly formed, very small perforations in a mutually random arrangement. Thus, the layer does not cover the outside of the skin in the manner of a closed surface. Accordingly, the permeable layer can also be regarded as having been built up from a multiplicity of discrete individual layer portions, which are in a mutually random arrangement, which have an irregular shape with respect to form and size and which are comprised of an elastic copolymer or copolymer blend. In the statistical mean, the individual layer portions here have the same thickness. Interspaces which are relatively small with respect to the average surface extent of individual layer portions of the permeable layer, are located between the layer portions (perforations of the layer) and represent layer areas which are permeable to fluids.

It is assumed that the majority of the layer portions, which form the layer, extend in part through into the base, that is to say into the tubing based on cellulose hydrate. Thus, the elastic copolymer in a fine dispersion is incorporated therein in the zone close to the surface.

The copolymers which form the layer in accordance with the first and third variants of the invention contain alcohols having a carbon atom number in the range from 2 to 10, preferably 4 carbon atoms, as the alcohol component of the structural units derived from copolymerized acrylates or methacrylates.

In the fourth embodiment according to the invention, the copolymers forming the layer are derived, to the extent of the quantitatively predominant part, from copolymerized monomers of the general formula $$CH_2=CH-\underset{R}{C}=CH_2$$

in which R denotes hydrogen, halogen, in particular chlorine, or a methyl group. In particular, the copolymers comprise, to the extent of the quantitatively predominant part, relative to the total weight thereof, (copolymerized) butadiene and, to the extent of the quantitatively smaller part, (copolymerized) acrylates, methacrylates, preferably butyl acrylate or butyl methacrylate, acrylic acid, methacrylic acid, acrylonitrile and styrene or mixtures thereof. A likewise preferred copolymer comprises, to the extent of the quantitatively predominant part, (copolymerized) butadiene and, to the extent of the quantitatively smaller part, isoprene or chloroprene or mixtures thereof.

According to the definition, the term elastic copolymers comprised of a blend of one or more chemically different elastic copolymers with a synthetic thermoplastic, non-elastic polymer, for example, a vinylidene chloride copolymer with a predominant proportion of vinylidene chloride, is likewise intended to apply if the copolymer blend is capable of forming permeable layers according to the definition.

The permeable layer on the outside of the tubing, or the aqueous copolymer dispersion used for the manufacture thereof, can contain additives, for example colloidal silica, to maintain distances in the layer, and waxes, silicones, polyethylene or polyethylene wax in a dispersed form as separating agents in amounts in the range from about 0.1 to 10% by weight, preferably from about 0.2 to 4% by weight, relative to the total weight of copolymer in the layer or the dispersed proportion of the aqueous dispersion. It is essential that the additives do not interfere with the formation of a permeable layer.

According to one of the embodiments of the invention, the permeable layer on the outside of the tubing comprises an elastic copolymer of from about 70 to 80% by weight of butyl acrylate, butyl methacrylate or mixtures thereof, but particularly preferably of butyl acrylate, of from about 29 to 15% by weight of ethyl acrylate, ethyl methacrylate or mixtures thereof, but particularly preferably ethyl acrylate, and of from about 1 to 5% by weight of acrylic acid, methacrylic acid or mixtures thereof, particularly preferably of acrylic acid.

The percent by weight data each refer to the total weight of the copolymer. Layers of the said copolymers are distinguished by particular softness without, however, a tendency to blocking.

According to the second variant of the invention, the permeable layer on the outside of the tubing comprises a blend of elastic copolymers, comprised of (1) at least about 80% by weight, relative to the total weight of the blend, of a copolymer comprised of from about 70 to 80% by weight of copolymerized butyl acrylate, butyl methacrylate or mixtures thereof, but particularly preferably butyl acrylate, of from about 29 to 15% by weight of copolymerized ethyl acrylate, ethyl methacrylate or mixtures of the two, but particularly preferably ethyl acrylate, and of from about 1 to 5% by weight of copolymerized acrylic acid, methacrylic acid or mixtures of the two, but particularly preferably acrylic acid, in each case relative to the total weight of the copolymer, and (2) up to about 20% by weight, relative to the total weight of the copolymer blend, of a copolymer comprised of from about 1 to 2% by weight in total of copolymerized acrylic acid, methacrylic acid or mixtures of the two, but particularly preferably acrylic acid, not more than about 15% by weight of copolymerized acrylonitrile and at least about 83% by weight of a copolymerized monomer of the general formula in which R is hydrogen, halogen, in particular chlorine, or a $CH_3$ group, or a mixture of the said monomers, in each case relative to the total weight of the monomer mixture, but in particular of butadiene.

The copolymer (2) of the copolymer blend can be manufactured by copolymerization of a mixture of copolymerizable monomers, which mixture comprises from about 1 to 2% by weight of acrylic acid, methacrylic acid or mixtures of the two, but particularly preferably acrylic acid, not more than about 15% by weight of acrylonitrile and at least about 83% by weight in total of a monomer of the general formula in which R is hydrogen, halogen, in particular chlorine, or a $CH_3$ group, or of a mixture of the said monomers, in each case relative to the total weight of the monomer mixture, but particularly preferably of butadiene.

Aqueous dispersions of an elastic copolymer which are suitable for the manufacture of tubing according to the invention contain from about 0.5 to 30% by weight in total, preferably from about 2 to 20% by weight in total, of dispersed copolymer relative to the total weight of the aqueous dispersion:

I. Aqueous copolymer dispersions in which the dispersed copolymer, to the extent of the quantitatively predominant part, comprises acrylates, preferably butyl acrylate, methacrylates, preferably butyl methacrylate, or mixtures thereof, and particularly preferably of butyl acrylate, and, to the extent of the quantitatively smaller part, in each case relative to the total weight of the copolymer, of acrylic acid, methacrylic acid or mixtures thereof, but particularly preferably acrylic acid. Particularly preferred copolymers of this group are those of from about 91 to 98% by weight of acrylates, preferably butyl acrylate, methacrylates, preferably butyl methacrylate, or mixtures thereof, and particularly preferably of butyl acrylate, and of from about 9 to 2% by weight of acrylic acid, methacrylic acid or mixtures thereof, and particularly preferably of acrylic acid. Very particularly preferred elastic copolymers of this group are those of about 98% by weight, butyl acrylate and about 2% by weight acrylic acid. The percent by weight data each refer to the total weight of the copolymer.

II. Aqueous copolymer dispersions, the dispersed copolymer fraction of which is comprised of a copolymer blend of at least about 70% by weight of a copolymer according to group I and of up to about 30% by weight of an elastic copolymer which, to the extent of the quantitatively predominant part of the copolymer, is derived from aliphatic dienes corresponding to the general formula in which R can be hydrogen, halogen, in particular chlorine, and an alkyl group, preferably lower alkyl and in particular a $CH_3$ group, butadiene being particularly preferred. The second copolymer of the copolymer blend according to II can, to the extent of the quantitatively smaller part, relative to its total weight, be built up from dienes of the above-mentioned formula, which differ in their chemical structure from that which forms the predominant part of the polymer. The quantitatively smaller part of the second copolymer of the copolymer blend according to II can, however, also be built up from acrylic acid, methacrylic acid, acrylates, methacrylates, acrylonitrile and styrene.

In a preferred aqueous dispersion of group II, the second part of the copolymer blend comprises a copolymer of at least about 80% by weight aliphatic dienes of the abovementioned general formula, in particular butadiene, and up to about 20% by weight acrylonitrile, styrene or mixtures thereof.

III. Suitable aqueous copolymer dispersions can also comprise copolymer blends which, in addition to the copolymers mentioned under I and/or II, also contain thermoplastic synthetic polymers, in particular vinylidene chloride copolymers having a predominant vinylidene chloride proportion.

The said aqueous copolymer dispersions here comprise a copolymer blend of the said type and contain the non-elastic copolymer in an amount of up to at most about 30% by weight, relative to the total weight of the copolymer blend.

IV. Aqueous copolymer dispersions, the dispersed fraction of which comprises a copolymer of from about 70 to 80% by weight of butyl acrylate, butyl methacrylate or mixtures thereof, particularly preferably butyl acrylate, of from about 29 to 15% by weight of ethyl acrylate, ethyl methacrylate or mixtures thereof, particularly preferably ethyl acrylate, and of from about 1 to 5% by weight of acrylic acid, methacrylic acid or mixtures thereof, in particular acrylic acid. That dispersion of group IV is here particularly preferred in which the dispersed copolymer is comprised of about 80% by weight of butyl acrylate, about 15% by weight of ethyl acrylate and about 5% by weight of acrylic acid.

V. Aqueous copolymer dispersions in which the dispersed copolymer comprises a copolymer blend of (1) at least about 80% by weight, relative to the total weight of the blend, of a copolymer obtained from about 70 to 80% by weight of butyl acrylate, butyl methacrylate or mixtures thereof, particularly preferably butyl acrylate, from about 29 to 15% by weight ethyl acrylate, ethyl methacrylate or mixtures thereof, in particular ethyl acrylate, and from about 1 to 5% by weight acrylic acid, methacrylic acid or mixtures thereof, particularly preferably acrylic acid, and (2) up to about 20% by weight, relative to its total weight, of a copolymer of from about 1 to 2% by weight acrylic acid, methacrylic acid or mixtures thereof, but preferably acrylic acid, up to at most about 15% by weight acrylonitrile and at least about 83% by weight of a monomer of the general formula in which R is hydrogen, halogen, in particular chlorine, or an alkyl group, in particular the $CH_3$ group, or mixtures of aliphatic dienes of the indicated general formula; particularly preferably, however, this is butadiene.

Within the group V, an aqueous copolymer dispersion is here particularly preferred, the dispersed fraction of which comprises a copolymer blend of (1) at least about 80% by weight, relative to the total weight of the blend, of a copolymer obtained from about 70% by weight of butyl acrylate, about 28% by weight of ethyl acrylate and about 2% by weight of acrylic acid, in each case relative to the total weight of the copolymer, and (2) up to about 20% by weight, relative to the total weight of the copolymer blend, of a copolymer of about 90% by weight butadiene, about 8% by weight acrylonitrile and about 2% by weight acrylic acid. According to a variant, the second copolymer of the copolymer blend comprises about 88% by weight of isoprene, about 10% by weight of acrylonitrile and about 2% by weight of acrylic acid. The percent by weight data each refer to the total weight of the copolymer.

The suitable aqueous copolymer dispersions according to I to V can contain known chemical dispersing aids which, compared with the total amount of dispersed copolymer, are negligible and which do not have any influence on the properties of the product obtained by the process.

It is also possible for the aqueous copolymer dispersions to contain, in solution, water-soluble chemical agents which are capable of plasticizing cellulose hydrate and are known for this purpose, i.e., so-called plasticizers, in an amount within the range from about 0.5 to 15% by weight, relative to the total weight of the dispersion. Examples of suitable chemical plasticizers are glycerol, triglycol or polyglycol. Aqueous copolymer dispersions which contain dissolved chemical plasticizers of this type, can be manufactured by dissolving a corresponding amount of the said chemical plasticizers in the aqueous starting dispersions of copolymer, for example, by stirring it into the latter.

The suitable aqueous copolymer dispersions are applied onto the outside of the tubing in such an amount that the outside of the tubing possesses a permeable layer, based on an elastic copolymer, the thickness of which corresponds to a weight per unit area in the range from about 0.5 to 8 g, particularly preferably from about 1 to 5 g, per $m^2$ of carrier surface.

In these suitable aqueous copolymer dispersions, the quantitatively predominant part of the dispersed copolymer particles has a particle size of at most about 0.08 $\mu$m, preferably about 0.05 $\mu$m and smaller. The dispersion does not contain any dispersed copolymer particles, which are larger than about 0.08 $\mu$m, in amounts which, due to their particle size, prevent the formation of permeable layers.

In the following text, the manufacture of the tubing according to the invention is explained by way of illustrative example.

Initially, tubing which is based on cellulose hydrate and which contains about 22% of glycerol as a secondary chemical plasticizer, is manufactured in a manner which is in itself known. The tubing is then provided on its inside with an adhesive-promoting chemical agent, for example epichlorohydrin/polyamide/polyamine, for example as described in British Patent Specification No. 1,201,830; U.S. Pat. No. 2,901,358; U.S. Pat. No. 3,378,379 and British Patent Specification No. 1,417,419, the disclosures of which are hereby incorporated by reference.

An adhesion-promoting chemical agent of the above-mentioned chemical structure is applied to the outside of the tubing by passing the tubing through a trough which is filled with a fluid which contains the said chemical adhesive agent in a concentration within the range between about 0.5 and 5% by weight, preferably from about 0.6 to 2.5% by weight, and then drying the tubing.

According to a method described in British Patent Specification No. 1,201,830 or according to the method described in U.S. Pat. No. 2,901,358 or U.S. Pat. No. 3,378,379, a film coating of a synthetic vinylidene chloride copolymer, which is impermeable to water vapor and which is described, for example, in U.S. Pat. No. 3,144,425, the disclosure of which is hereby incorporated by reference, is then applied to the inside of the tubing.

The tubing with a film coating on its inside which is impermeable to water vapor is then continuously passed at a constant speed through a trough which is filled with an aqueous copolymer dispersion which, for example, contains a proportion of 10% by weight of elastic copolymer, relative to the total weight of the dispersion, the dispersed copolymer being, for example, of a type which comprises 70% by weight of copolymerized butyl acrylate, 28% by weight of copolymerized ethyl acrylate and 2% by weight of copolymerized acrylic acid, each relative to the total weight of the copolymer. The quantitatively predominant part of the dispersed copolymer particles of the dispersion has a particle size of about 0.05 $\mu$m and smaller.

The dispersion contains, for example, glycerol as a secondary chemical plasticizer dissolved in the dispersing medium in an amount of, for example, 5% by weight, relative to the total weight of the copolymer dispersion.

After the tubing has left the trough filled with the dispersion, it is dried, for example, by passing it through a drying tunnel, the temperature in the interior thereof being sufficient to drive off the dispersing medium. During this drying process, the carrier tubing loses a part of its water content so that, after the drying process, it contains water in the range from about 10 to 12%. The cellulose hydrate carrier tubing has a content of secondary plasticizer, for example of glycerol, of about 22%.

The glycerol content of the carrier tubing is obtained as the result of the known process conditions in the manufacture of tubing from cellulose hydrate, under which conditions the cellulose hydrate tubing is passed after its manufacture through an aqueous solution of glycerol, the tubing containing the desired proportion of secondary plasticizer depending on its residence time in the solution.

The dried tubing based on cellulose hydrarte has on its inside a film coating which is impermeable to water vapor and a permeable layer of elastic polymer on its outside. It is then moistened with water, for example by spraying. After the moistening step, the tubing has a water content in the range from about 6 to 20%, preferably a water content in the range from about 8 to 12%, relative to the weight of the carrier tubing.

Figure 1:
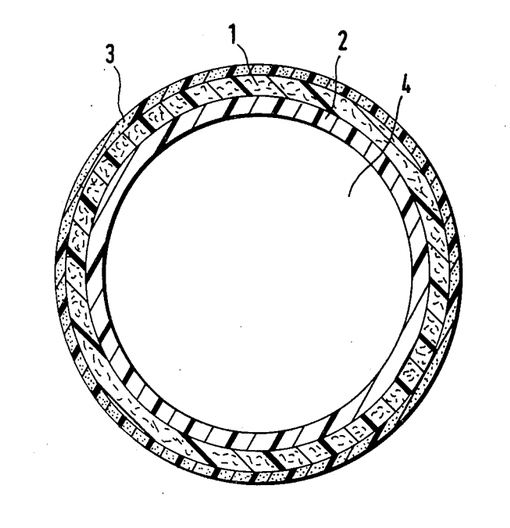

In the figure of drawing, tubing according to the invention is shown diagrammatically and in cross-section, by way of example. The numeral 1 designates the carrier tubing of cellulose hydrate, the numeral 2 designates the film coating of thermoplastic polymer on the inside of the tubing, and the numeral 3 designates the permeable layer of elastic copolymer on the outside of the tubing, whereas the cavity of the tubing is identified as 4. For the sake of graphical simplification, the adhesion-promoting chemical agent between the layer 3 and the carrier tubing 1 or between the film coating 2 and the carrier tubing 1 is not shown in the drawing.

The present invention is further illustrated by means of the following illustrative examples.

EXAMPLE 1

Viscose tubing of 60 bore, having in its wall a fiber paper insert as a matrix, is spun into a known precipitating bath, regenerated, washed, plasticized by the action of an aqueous solution which contains a secondary plasticizer in the form of glycerol, and prepared, on its inside and outside, with a chemical anchoring agent in the form of melamine/formaldehyde pre-condensate.

The coating is carried out in a dried which consists of an ascending and descending part and has a guide roller at the top. An annular spray nozzle is fitted above the descending part of the drier, and this nozzle is surrounded by a plexiglass housing. One pair of squeeze rollers is located before the inlet and under the outlet of the drier. About 8 to 9 l. of an aqueous dispersion of the following composition are now filled into the tubing of about 350 m length: 7% of polyvinylidene chloride copolymer which is prepared by copolymerization of a mixture of copolymerizable monomers, which comprises 88% by weight of vinylidene chloride, 3% by weight of acrylic acid, 7.5% by weight of acrylonitrile and 1.5% by weight of methyl methacrylate, each relative to the weight of the monomer mixture.

The tubing is introduced into the drier in such a way that a part of the dispersion forms a level in front of the inlet squeeze roller and it is inflated to a diameter of 60 mm by means of compressed air. Before entering the descending heating zone, the hot surface of the tubing is now sprayed with an aqueous dispersion of the following composition:

The aqueous dispersion contains 5% by weight of dispersed polymer fraction, relative to the total weight of the dispersion, consisting of an elastic copolymer obtained from 98% by weight of butyl acrylate and 2% by weight of acrylic acid. In addition, the dispersion contains 6% by weight of dissolved glycerol, relative to the total weight of the dispersion, and 0.5% by weight of silica, relative to the weight of the dispersed copolymer.

The quantitatively predominant part of the dispersed copolymer particles has a particle size of about 0.05 $\mu$m.

The copolymer dispersion is applied to the outside of the carrier tubing in such an amount that the dry permeable layer has a thickness which corresponds to a weight of 2 g of copolymer per $m^2$ of surface area of the outside of the carrier tubing. For drying, the tubing is passed through a heating tunnel where the prevailing temperature—110° C.—is sufficient to evaporate the dispersing medium and dries the tubing.

After the tubing has left the drying tunnel, it is adjusted to a water content of about 10% by weight, relative to the carrier tubing of cellulose hydrate, by spraying with water.

The very supple tubing is characterized with respect to its properties by the parameters indicated in the table which follows, the letters A, B and C in the table having the following meaning:

A = Test specimen: tubing according to the Example
 water content: 10 to 12% by weight glycerol content: 22% by weight (secondary chemical plasticizer) each relative to the total weight of carrier tubing. The measured data have been determined on tubing according to A.

B = Test specimen, prepared as follows:
 1. Tubing according to A is essentially completely freed from the glycerol content by extraction with hot water.
 2. Tubing according to 1. is dried.
 3. Tubing according to 2. is moistened with water; water content of the moistened tubing: 10 to 12% by weight, relative to the total weight of the carrier tubing.
 The measured data have been determined on tubing according to B (3.).

C = Test specimen: cellulose hydrate tubing having a film coating on its inside and dimensioned in accordance with the Example
 water content: 10 to 12% by weight
 glycerol content: 20.5% by weight
 each relative to the total weight of carrier tubing. The tubing differs from the tubing according to Example (A) in that it has no layer of synthetic elastic polymer on its outside.

| Properties | Tubing according to Example | | Comparative tubing |
|---|---|---|---|
| | "A" | "B" | "C" |
| Breaking length, longitudinal | 3,600 m | 3,550 m | 3,500 m |
| Breaking length, transverse | 3,400 m | 3,450 m | 3,300 m |
| Elongation at break, longitudinal | 32% | 32% | 28% |

|  | Tubing according to Example | | Comparative tubing |
|---|---|---|---|
| Properties | "A" | "B" | "C" |
| Elongation at break, transverse | 34% | 32% | 34% |
| Bursting pressure, m water gauge | 11.6 | 11.8 | 11.0 |
| Weight per m² | 106 g | 98 g | 102 g |
| Tear propagation resistance, [kp/mm], longitudinal | 1.8 | 1.7 | 1.4 |
| (dry) transverse | 1.6 | 1.55 | 1.2 |

On filling with a sausage material, no differences can be found; after storage at room temperature at 30 to 40% relative humidity, the sausages can be cut open without tearing. No sausage material is squeezed out at the cutting surface.

EXAMPLE 2

Tubing of 60 bore is coated on the inside, as described in Example 1. Before entering the descending heating zone, however, an aqueous dispersion of the following composition is sprayed on:

The aqueous dispersion contains the following constituents: 6% by weight in total, relative to the total weight of the dispersion, of a copolymer blend which consists of 4% by weight of an elastic copolymer according to Example 1 and of 2% by weight, in each case relative to the total weight of the dispersion, of a synthetic thermoplastic non-elastic copolymer, the recurring structural units of which are derived 88% from vinylidene chloride, 2% from acrylic acid, 6% from methyl acrylate and 4% from acrylonitrile. The dispersion also contains 5% by weight of glycerol, relative to the total weight of the dispersion, and 0.4% by weight of silica, relative to the total weight of the dispersed polymer fraction.

In the table which follows, the letters A and C have the following meaning:

A = Test specimen: tubing according to the Example
water content: 10 to 12% by weight
glycerol content: 22% by weight(secondary chemical plasticizer)
each relative to the total weight of carrier tubing. The measured data have been determined on a tubing according to A.

C = Test specimen: cellulose hydrate tubing having a film coating on its inside and dimensioned according to the Example.
water content: 10 to 12% by weight
glycerol content: 21.5% by weight
each relative to the total weight of the carrier tubing. The tubing differs from the tubing according to Example (A) in that it has no layer of synthetic elastic polymer on its outside.

| Properties | Tubing according to Example "A" | Comparative tubing "C" |
|---|---|---|
| Breaking length, longitudinal | 3,800 m | 3,600 m |
| Breaking length, transverse | 3,600 m | 3,450 m |
| Elongation at break, longitudinal | 32% | 30% |
| Elongation at break, transverse | 34% | 32% |
| Bursting pressure, m water gauge | 11.8 | 10.5 |
| Weight per m² | 105 g | 100 g |
| Tear propagation resistance, [kp/mm], longitudinal | 1.8 | 1.3 |
| (dry) transverse | 1.65 | 1.25 |

The aqueous polymer dispersion is here applied to the outside of the carrier tubing in such an amount that the permeable layer of elastomeric polymer on the outside of the tubing has a thickness which corresponds to a weight per unit area of 3.8 g of polymer per m² of substrate. The sausages in these skins do not tear open under normal conditions when they are cut.

EXAMPLE 3

The procedure of Example 2 is followed, but with the difference that the thermoplastic vinylidene chloride copolymer is of a type which is prepared by copolymerization of a mixture of monomers capable of copolymerization, the monomer mixture consisting of 88% by weight of vinylidene chloride, 2% by weight of acrylic acid, 4% by weight of acrylonitrile and 6% by weight of methyl acrylate.

EXAMPLE 4

A tubing of 60 bore is prepared and coated on the inside, as described in Example 1.

Before entering the descending heating zone, an aqueous dispersion of the following make-up is sprayed on: 9% by weight in total of an elastic copolymer, of which 6% by weight of total dispersed copolymer consist of a copolymer, the molecule chains of which each comprise 97% of recurring structural units derived from butyl acrylate and 3% of recurring structural units based on acrylic acid, and of which 3% by weight of total dispersed polymer fraction consist of an elastic copolymer, the molecule chains of which each consist of 80% of structural units derived from butadiene, 18% of recurring structural units derived from acrylonitrile and 2% of recurring structural units derived from acrylic acid. The particle size of the quantitatively predominant part of dispersed elastic copolymer particles based on acrylate is about 0.05 μm.

The polymer dispersion also contains 5% by weight of glycerol, relative to the total weight of dispersion, and 0.4% by weight of silica, relative to the total weight of the dispersed polymer.

After removal of the secondary plasticizer, the cellulose hydrate is so supple that sausages, even when filled nearly to bursting and at up to 30% relative humidity, can be cut open without tearing.

EXAMPLE 5

A cellulose hydrate tubing of 60 bore having a fiber paper insert as a matrix is, in the customary manner, spun, regenerated, washed, plasticized by the action of an aqueous solution which contains a secondary plasticizer in the form of glycerol, and treated, on its inside and outside, with a chemical anchoring agent in the form of melamine/formaldehyde pre-condensate. The coating is carried out in a drier which consists of an ascending and descending part and has a guide roller at the top. An annular spray nozzle is fitted above the descending part of the drier, and this nozzle is surrounded by a plexiglass housing. One pair of squeeze rollers is located before the inlet and under the outlet of the drier.

About 8 to 9 l. of an aqueous dispersion of the following composition are now filled into the tubing of about 350 m length: 7% of polyvinylidene chloride copolymer which is prepared by copolymerization of the mixture of copolymerizable monomers, which comprises 88% by weight of vinylidene chloride, 3% by weight of acrylic acid, 7.5% by weight of acrylonitrile and 1.5% by weight of methyl methacrylate, relative to the weight of the monomer mixture.

The tubing is introduced into the drier in such a way that a part of the dispersion forms a level in front of the inlet squeeze roller and it is inflated to a diameter of 60 mm by means of compressed air. Before entering the descending heating zone, the hot surface of the tubing is now sprayed with an aqueous dispersion of the following composition:

The aqueous dispersion contains 5% by weight of a dispersed elastic copolymer which consists of 75% by weight of copolymerized butyl acrylate, 5% by weight of copolymerized butyl methacrylate, 16% by weight of copolymerized ethyl acrylate, 2% by weight of copolymerized ethyl methacrylate and 2% by weight of copolymerized acrylic acid.

The quantitatively predominant part of the copolymer particles has a particle size of 0.05 $\mu$m and smaller.

The copolymer dispersion is applied to the outside of the carrier tubing in such an amount that it corresponds to 4.5 g of copolymer per m$^2$ of the outside of the carrier tubing. The tubing is then passed through a heating tunnel where the prevailing temperature—110° C.—is sufficient to evaporate the dispersing medium and dries the tubing.

After the tubing has left the drying tunnel, it is adjusted to a water content of about 10% by weight, relative to the carrier tubing of cellulose hydrate, by spraying with water.

The permeable layer has a thickness which corresponds to a weight of 2 g of copolymer per m$^2$ of surface area of the outside of the carrier tubing.

When casings according to Example 5 are used for preparing sausages, the sausage casing is so supple that it can be cut open without tearing even if the sausage skin no longer contains any secondary chemical plasticizer in the course of its intended use as a result of boiling in hot water. This is true at relative humidities up to 30%.

EXAMPLE 6

The tubing is prepared in accordance with the instructions in Example 5, but with the modification that the aqueous copolymer dispersion used contains 10% by weight, relative to the total weight of dispersion, of a dispersed elastic copolymer which consists of 70% by weight of copolymerized butyl acrylate, 28% by weight of copolymerized ethyl acrylate and 2% by weight of copolymerized acrylic acid, each relative to the total weight of the copolymer, and the dispersed copolymer particles have a particle size of 0.05 $\mu$m and smaller.

EXAMPLE 7

The tubing is prepared in accordance with the instructions in Example 5, but with the modification that the aqueous copolymer dispersion used contains 5% by weight, relative to the total weight of the dispersion, of an elastic copolymer which consists of 80% by weight of copolymerized butyl acrylate, 15% by weight of copolymerized ethyl acrylate and 5% by weight of copolymerized acrylic acid, each relative to the total weight of the copolymer, and the dispersed copolymer particles have a particle size of 0.05 $\mu$m and smaller.

EXAMPLE 8

The operation of the tubing is carried out by the procedure indicated in Example 5, but with the modification that the aqueous copolymer dispersion used contains 10% by weight, relative to the total weight of the dispersion, of a copolymer blend of (1) 80% by weight, relative to the total weight of the blend, of a copolymer obtained from 70% by weight of copolymerized butyl acrylate, 28% by weight of copolymerized ethyl acrylate and 2% by weight of copolymerized acrylic acid, each relative to the total weight of the copolymer, and (2) 20% by weight, relative to the total weight of the blend, of a copolymer obtained from 90% by weight of copolymerized butadiene, 8% by weight of copolymerized acrylonitrile and 2% by weight of copolymerized acrylic acid, each relative to the total weight of the copolymer.

The copolymer particles of the two copolymers present in the blend each have a particle size of smaller than 0.08 $\mu$m.

EXAMPLE 9

The preparation of the tubing is carried out by the procedure indicated in Example 5, but with the modification that the aqueous copolymer dispersion used contains 5% by weight, relative to the total weight of the dispersion, of a copolymer blend of (1) 80% by weight, relative to the total weight of the blend, of a copolymer obtained from 70% by weight of copolymerized butyl acrylate, 28% by weight of copolymerized ethyl acrylate and 2% by weight of copolymerized acrylic acid, each relative to the total weight of the copolymer, and (2) 20% by weight, relative to the total weight of the blend, of a copolymer obtained from 88% by weight of copolymerized isoprene, 10% by weight of copolymerized acrylonitrile and 2% by weight of copolymerized acrylic acid, each relative to the total weight of the copolymer.

All the copolymer particles contained in the dispersion have, to the extent of the quantitatively predominating part, a particle size smaller than 0.08 $\mu$m.

What is claimed is:

1. A multiple layered film in the form of a tubular sausage casing, comprising:
   a central layer of a cellulose hydrate-based material;
   a first layer on the inside surface of said central layer, said first layer comprising a continuous film of a first polymer comprising thermoplastic synthetic resinous material selected from a vinylidene chloride copolymer having a major proportion of vinylidene chloride, said thermoplastic synthetic resinous film being impermeable to water and water vapor; and
   a second layer on the outside surface of said central layer, said second layer comprising a film of a second polymer different from said first polymer and comprising a synthetic elastic copolymer selected from the group consisting of (a) a copolymer comprising a major proportion of an acrylate, a methacrylate or a mixture thereof and a minor portion of acrylic acid, methacrylic acid or a mixture thereof, (b) a copolymer comprising a major proportion of an aliphatic diene, selected from the group of butadiene, isoprene, chloroprene or a mixture thereof, and (c) a blend of chemically different copolymers of said elastic copolymers, said synthetic elastic copolymer film being permeable to water and water vapor.

2. In a sausage product having a filling and a sausage casing, the improvement which comprises said sausage casing comprising the tube as defined by claim 1.

3. A multiple layered film as defined by claim 1, wherein the permeable second layer comprises a copolymer comprising a major proportion of an acrylate, a methacrylate or a mixture thereof and a minor portion of acrylic acid, methacrylic acid or a mixture thereof.

4. A multiple layered film as defined by claim 3, wherein the permeable second layer comprises a copolymer wherein said major proportion comprises butyl acrylate, butyl methacrylate or a mixture of the two.

5. A multiple layered film as defined by claim 4, wherein the permeable second layer comprises a copolymer comprising from about 91 to 98% by weight butyl acrylate, butyl methacrylate or a mixture of the two and from about 9 to 2% by weight of acrylic acid, methacrylic acid or a mixture of the two, based upon the total weight of the copolymer.

6. A multiple layered film as defined by claim 5, wherein the permeable second layer comprises a copolymer comprising about 98% by weight of butyl acrylate and about 2% by weight of acrylic acid, based upon the total weight of the copolymer.

7. A multiple layered film as defined by claim 1, wherein the permeable second layer comprises a copolymer comprising a major proportion of an aliphatic diene, selected from the group of butadiene, isoprene, chloroprene or a mixture thereof.

8. A multiple layered film as defined by claim 7, wherein said copolymer further comprises a minor proportion of acrylate, methacrylate, acrylic acid, methacrylic acid, acrylonitrile, styrene or a mixture thereof.

9. A multiple layered film as defined by claim 1, wherein the permeable second layer comprises a blend of chemically different copolymers of said elastic copolymers.

10. A multiple layered film as defined by claim 9, wherein the blend comprises a plurality of chemically different elastic copolymers, each copolymer comprising a major proportion of an acrylate, methacrylate or a mixture thereof and a minor portion of acrylic acid, methacrylic acid or a mixture thereof.

11. A multiple layered film as defined by claim 9, wherein the blend comprises a copolymer comprising a major proportion of an acrylate, methacrylate or a mixture thereof and a minor portion of acrylic acid, methacrylic acid or a mixture thereof and a copolymer comprising a major proportion of an aliphatic diene, selected from the group of butadiene, isoprene, chloroprene or a mixture thereof.

12. A multiple layered film as defined by claim 1, wherein the permeable second layer comprises a copolymer blend of (1) a major proportion of a first copolymer comprising about 97% by weight butyl methacrylate or butyl acrylate and about 3% by weight methacrylic acid or acrylic acid, based on the total weight of copolymer, and (2) a minor proportion of a second copolymer comprising a major proportion of butadiene and a minor proportion of acrylonitrile, styrene or a mixture of the two.

13. A multiple layered film as defined by claim 1, wherein the permeable second layer comprises an elastic copolymer comprising from about 70 to 80% by weight of copolymerized butyl acrylate, butyl methacrylate or a mixture thereof, from about 29 to 15% by weight of copolymerized ethyl acrylate, ethyl methacrylate or a mixture thereof and from about 1 to 5% by weight of copolymerized acrylic acid, methacrylic acid or a mixture of the two, based on the total weight of the copolymer.

14. A multiple layered film as defined by claim 1, wherein the permeable second layer comprises a blend of elastic copolymers, comprising (1) at least about 80% by weight, relative to the total weight of the blend, of a first copolymer comprised of from about 70 to 80% by weight of copolymerized butyl acrylate, butyl methacrylate or a mixture thereof, from about 29 to 15% by weight of copolymerized ethyl acrylate, ethyl methacrylate or a mixture of the two and from about 1 to 5% by weight of copolymerized acrylic acid, methacrylic acid or a mixture of the two based on the total weight of the copolymer, and (2) up to about 20% by weight, relative to the total weight of the blend, of a second copolymer comprised of from about 1 to 2% by weight of copolymerized acrylic acid, methacrylic acid or a mixture of the two, up to about 15% by weight of copolymerized acrylonitrile and at least about 83% by weight of at least one copolymerized monomer of the formula in which R is hydrogen, halogen or methyl.

15. A multiple layered film as defined by claim 14, wherein R is chlorine.

16. A multiple layered film as defined by claim 14, wherein the second copolymer of the blend comprises about 90% by weight of copolymerized butadiene, about 8% by weight of copolymerized acrylonitrile and about 2% by weight of copolymerized acrylic acid.

17. A multiple layered film as defined by claim 14, wherein the second copolymer of the copolymer blend comprises about 88% by weight of copolymerized isoprene, about 10% by weight of copolymerized acrylonitrile and about 2% by weight of copolymerized acrylic acid.

18. A multiple layered film as defined by claim 1, wherein the permeable second layer comprises a copolymer comprising from about 70 to 80% by weight of copolymerized butyl acrylate, butyl methacrylate or a mixture thereof, from about 29 to 15% by weight of copolymerized ethyl acrylate, ethyl methacrylate or a mixture thereof and from about 1 to 5% by weight of copolymerized acrylic acid, methacrylic acid or a mixture of the two, based on the total weight of the copolymer, the three-dimensional structural build-up of the layer being obtained by applying to the outside of the tubing an aqueous copolymer dispersion in an amount sufficient to provide on said tube an amount of copolymer in the range from about 0.5 to 8 g/m² of tube surface and wherein the major proportion of the dispersed copolymer particles of the dispersion has a size not larger than about 0.08 μm.

19. A multiple layered film as defined by claim 18, wherein said copolymer particle size is not larger than about 0.05 μm.

20. A multiple layered film as defined by claim 1, wherein the permeable second layer comprises a blend of elastic copolymers, comprising (1) at least about 80% by weight, relative to the total weight of the blend, of a first copolymer comprising from about 70 to 80% by weight of copolymerized butyl acrylate, butyl methacrylate or a mixture thereof, from about 29 to 15% by weight of copolymerized ethyl acrylate, ethyl methacrylate or a mixture thereof and from about 1 to 5% by weight of copolymerized acrylic acid, methacrylic acid or a mixture of the two, based on the total weight of the copolymer, and (2) up to about 20% by weight, relative to the total weight of the blend, of a second copolymer comprising from about 1 to 2% by weight of copolymerized acrylic acid, methacrylic acid or a mixture of the two, up to about 15% by weight of copolymerized acrylonitrile and at least about 83% by weight of at least one copolymerized monomer of the general formula in which R is hydrogen, halogen or a CH₃ group, based on the total weight of the copolymer blend, its three-dimensional structural build-up being obtained by applying to the outside of the tubing an aqueous copolymer dispersion in an amount sufficient to provide on the tube an amount of copolymer in the range of from about 0.5 to 8 g/m² of tubing surface, and wherein the major proportion of the total dispersed copolymer particles has a size not larger than about 0.08 μm.

21. A multiple layered film as defined by claim 20, wherein the second copolymer of the copolymer blend comprises about 90% by weight of copolymerized butadiene, about 8% by weight of copolymerized acrylonitrile and about 2% by weight of copolymerized acrylic acid.

22. A multiple layered film as defined by claim 20, wherein the second copolymer of the copolymer blend comprises about 88% by weight of copolymerized isoprene, about 10% by weight of copolymerized acrylonitrile and about 2% by weight of copolymerized acrylic acid.

23. A multiple layered film as defined by claim 1, wherein the impermeable first layer coating comprises a copolymer of about 88% by weight of vinylidene chloride, about 3% by weight of acrylic acid, about 7.5% by weight of acrylonitrile and about 1.5% by weight of butyl methacrylate.

24. A multiple layered film as defined by claim 1, wherein the permeable second layer has a thickness which corresponds to a weight per unit area in the range from about 0.5 to 8 g of copolymer per m² of surface area of the tube.

25. A multiple layered film as defined by claim 1, wherein the permeable second layer has a three-dimensional structural build-up which is obtained by applying to the tube an aqueous copolymer dispersion in which the dispersed copolymer particles have a size not larger than about 0.08 μm and applying the aqueous dispersion in an amount sufficient to form a layer on the outside of the tube of copolymer having a thickness in the range from about 0.5 to 8 g/m² of tube surface.

26. A process for producing a multiple layered film in the shape of a tube comprising:

a central layer of a cellulose hydrate-based material;

a first layer of the inside surface of said central layer, said first layer comprising a continuous film of a first polymer comprising thermoplastic synthetic resinous material selected from a vinylidene chloride copolymer having a major proportion of vinylidene chloride, said thermoplastic synthetic resinous film being impermeable to water and water vapor;

a second layer on the outside surface of said central layer, said second layer comprising a film of a second polymer different from said first polymer and comprising a synthetic elastic copolymer selected from the group consisting of (a) a copolymer comprising a major proportion of an acrylate, a methacrylate or a mixture thereof and a minor portion of acrylic acid, methacrylic acid or a mixture thereof, (b) a copolymer comprising a major proportion of an aliphatic diene, selected from the group of butadiene, isoprene, chloroprene or a mixture thereof, and (c) a blend of chemically different copolymers of said elastic copolymers, said synthetic elastic copolymer film being permeable to water and water vapor; said process comprising the steps of coating a carrier tube of a cellulose hydrate-based material on its inside surface with said first layer of a synthetic thermoplastic polymer;

applying to the outside surface of said carrier tube an aqueous dispersion of said synthetic elastic copolymer, wherein the major proportion of said copolymer comprises particles having a size not larger than about 0.08 μm, to produce on the outside surface of the carrier tube a layer of copolymer having a thickness corresponding to a weight per unit area of from about 0.5 to 8 gram of copolymer per m² of carrier tube surface; and drying the tube to remove the water from said dispersion.

27. A process as claimed in claim 26, wherein the dispersed copolymer comprises a major proportion of a copolymerized acrylate, methacrylate or a mixture of the two and a minor proportion of copolymerized acrylic acid, methacrylic acid or a mixture of the two, based upon the total weight of the copolymer.

28. A process as claimed in claim 27, wherein the major proportion of the dispersed copolymer comprises copolymerized butyl acrylate, butyl methacrylate or a mixture of the two.

29. A process as claimed in claim 27, wherein the dispersed copolymer comprises from about 91 to 98% by weight of a copolymerized acrylate, methacrylate or a mixture of the two and from about 9 to 2% by weight of copolymerized acrylic acid, methacrylic acid or a mixture of the two, based on the total weight of the copolymer.

30. A process as claimed in claim 29, wherein the dispersed copolymer comprises about 98% by weight of copolymerized butyl acrylate and about 2% by weight of copolymerized acrylic acid, based on the total weight of the copolymer.

31. A process as claimed in claim 26, wherein the dispersed copolymer comprises a blend of chemically different elastic copolymers selected from said elastic copolymers, comprising a major proportion of a first elastic copolymer and a minor proportion of a second elastic copolymer comprised of at least one copolymerized aliphatic diene selected from the group of butadiene or isoprene, and a copolymerized acrylate, methacrylate, acrylic acid, methacrylic acid, acrylonitrile or styrene.

32. A process as claimed in claim 31, wherein said second copolymer contains butyl acrylate or butyl methacrylate.

33. A process as claimed in claim 26, wherein the aqueous dispersion comprises a major proportion of a blend of elastic copolymers and a minor proportion of a vinylidene chloride copolymer having a predominant proportion of copolymerized vinylidene chloride.

34. A process as claimed in claim 33, wherein the synthetic thermoplastic vinylidene chloride copolymer comprises about 88% by weight of copolymerized vinylidene chloride, about 3% by weight of copolymerized acrylic acid, about 7.5% by weight of copolymerized acrylonitrile and about 1.5% by weight of copolymerized butyl methacrylate, based on the total weight of the copolymer.

35. A process as claimed in claim 26, wherein the dispersed copolymer comprises from about 70 to 80% by weight of copolymerized butyl acrylate, butyl methacrylate or a mixture of the two, from about 29 to 15% by weight of copolymerized ethyl acrylate, ethyl methacrylate or a mixture of the two and from about 1 to 5% by weight of a copolymerized acrylic acid, methacrylic acid or a mixture of the two, based on the total weight of the copolymer.

36. A process as claimed in claim 26, wherein the dispersed copolymer comprises a copolymer blend comprising (1) about 80% by weight, relative to the total weight of the copolymer blend, of a copolymer comprising from about 70 to 80% by weight of copolymerized butyl acrylate, butyl methacrylate or a mixture thereof, from about 29 to 15% by weight of copolymerized ethyl acrylate, ethyl methacrylate or a mixture of the two and from about 1 to 5% by weight of copolymerized acrylic acid, methacrylic acid or a mixture of the two, based on the total weight of the copolymer, and (2) about 20% by weight, relative to the total weight of the copolymer blend, of a copolymer comprising from about 1 to 2% by weight of copolymerized acrylic acid, methacrylic acid or a mixture of the two, up to about 15% by weight of copolymerized acrylonitrile and at least about 83% by weight of at least one copolymerized monomer of the formula in which R is hydrogen, halogen, or a $CH_3$ group, based on the total weight of the copolymer.

37. A process as claimed in claim 35, wherein the copolymer comprises about 80% by weight of copolymerized butyl acrylate, about 15% by weight of copolymerized ethyl acrylate and about 5% by weight of copolymerized acrylic acid, based on the total weight of the copolymer.

38. A process as claimed in claim 36, wherein the dispersed copolymer comprises a copolymer blend comprising (1) about 80% by weight, relative to the total weight of the blend, of a copolymer comprising about 80% by weight of copolymerized butyl acrylate, about 15% by weight of copolymerized ethyl acrylate and about 5% by weight of copolymerized acrylic acid, based on the total weight of the copolymer and about 20% by weight, relative to the total weight of the copolymer blend, of a copolymer comprising about 90% by weight of copolymerized butadiene, about 8% by weight of copolymerized acrylonitrile and about 2% by weight of copolymerized acrylic acid, based on the total weight of the copolymer.

39. A process as claimed in claim 36, wherein the dispersed copolymer comprises a copolymer blend comprising about 80% by weight, relative to the total weight of the blend, of a copolymer comprising about 80% by weight of copolymerized butyl acrylate, about 15% by weight of copolymerized ethyl acrylate and about 5% by weight of copolymerized acrylic acid, based on the total weight of the copolymer and about 20% by weight, relative to the total weight of the blend, of a copolymer comprising about 88% by weight of copolymerized isoprene, about 2% by weight of copolymerized acrylic acid and about 10% by weight of copolymerized acrylonitrile, based on the total weight of the copolymer.

40. A process as claimed in claim 26, wherein the major proportion of the dispersed copolymer particles has a particle size smaller than about 0.05 μm.

41. A process as claimed in claim 26, wherein the aqueous copolymer dispersion contains from about 5 to 10% by weight of copolymer, relative to the total weight of the dispersion.

42. A process as claimed in claim 26, wherein the dispersing medium of the aqueous dispersion contains a secondary chemical plasticizer selected from glycerol, glycol or polyglycol.

43. A process as claimed in claim 26, further comprising the step of moistening the dried tube to a predetermined water content.

* * * * *